Dec. 24, 1968  D. D. HARMON  3,418,484
OPTICAL ATTENUATOR AND OPTICAL WEDGE ADJUSTERS
COUPLED TOGETHER TO PREVENT OVERRIDING
Filed Feb. 24, 1966  2 Sheets-Sheet 1
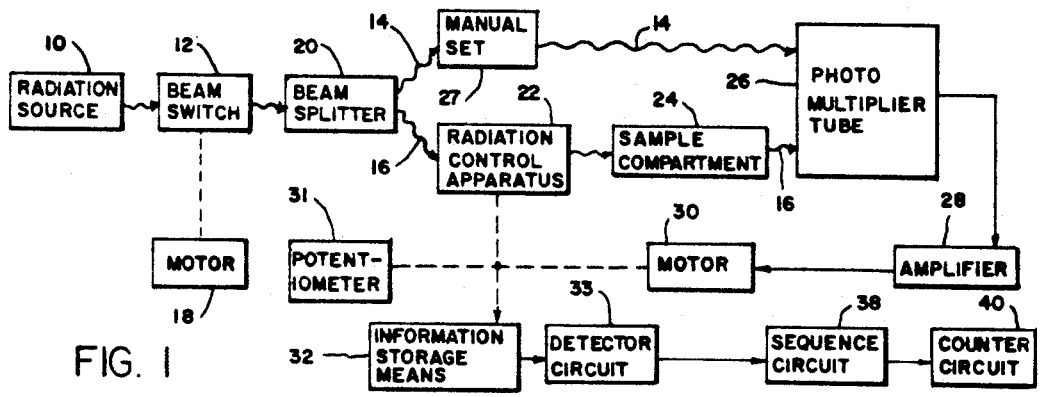
FIG. 1
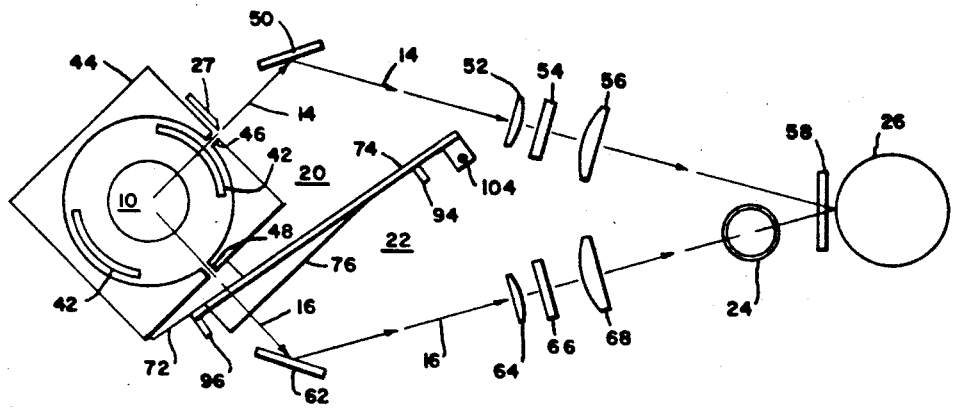
FIG. 2
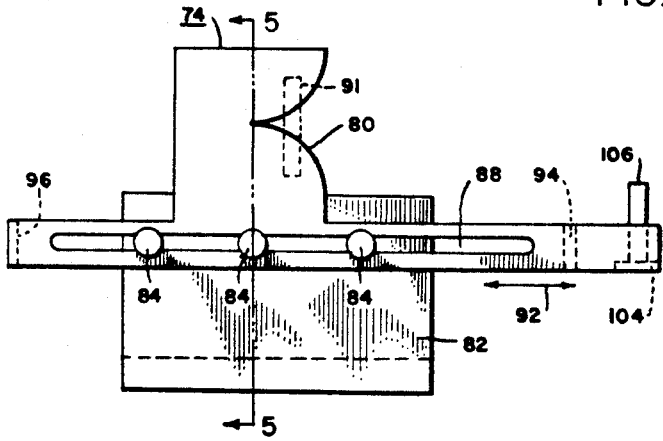
FIG. 4
FIG. 5
DUANE D. HARMON
INVENTOR.
BY Charles C. Krauss
ATTORNEY

United States Patent Office 3,418,484
Patented Dec. 24, 1968

3,418,484
OPTICAL ATTENUATOR AND OPTICAL WEDGE ADJUSTERS COUPLED TOGETHER TO PREVENT OVERRIDING
Duane D. Harmon, Irondequoit, N.Y., assignor to Bausch & Lomb Incorporated, Rochester, N.Y., a corporation of New York
Filed Feb. 24, 1966, Ser. No. 529,852
15 Claims. (Cl. 250—237)

The invention relates to control apparatus in general and more particularly to control apparatus for controlling the intensity of radiation applied to an element.

In various controlled processes, such as those embodied in radiation sensitive testing apparatus, it is desirable to accurately control the amount of radiation that is applied to a radiation sensitive element. The radiation sensitive element may be an unknown test sample having its radiation responsive characteristics studied, or a control element for generating a signal that is a function of the intensity of the applied radiation. An example of such apparatus is a photometer wherein the intensity of radiation is controlled to provide a nulling or balancing effect to obtain a test measurement.

In order to be fully effective, such control apparatus must be capable of accurately controlling a wide range of intensities so that precise measurements can be made. Furthermore, such control apparatus should be adaptable to be motor driven to be used in automated types of testing apparatus or processes.

Radiation intensity is generally controlled by either electrically controlling the intensity of a source of radiation, or optically controlling the intensity of radiation transmitted from the source, or both. Although the amount of radiation generated by a source can be electrically controlled for a wide range of intensities, such a control system is not readily adaptable for use with double beam photometers wherein a test beam is generally compared with a reference beam from the same source. In addition, the electrical controls for such a system change with time and temperature requiring frequent recalibration for precise measurements. Optical radiation control systems including a single optical wedge or a slit comb are limited in their application. For example, for a wide range of control a very long wedge is required. In addition, it is impractical to design a wedge in a manner so that its thickness increases gradually to infinite absorbance. The wedge generally is designed with a finite minimum absorbance and increases gradually to a limited maximum point of absorbance. Any measurement beyond such limits results either in zero or infinite absorbance resulting in a limited range of operation of linear control. If such wedge is employed in an automated system, oscillations tend to occur when the wedge is driven beyond the range of linear control resulting in undesirable wear on the mechanism.

It is therefore an object of this invention to provide a new and improved radiation control apparatus.

It is also an object of this invention to provide a new and improved radiation control apparatus that accurately controls the intensity of radiation received by an element over a wide range of intensities.

It is still a further object of this invention to provide a new and improved radiation control apparatus including a coarse control for initially presetting a range of radiation intensities to be applied to an element and a fine control for accurately controlling the intensity of radiation applied to the element in the preset range.

It is still a further object of this invention to provide a new and improved radiation control system for increasing the effective range of an optical wedge.

Radiation control apparatus embodying the invention includes a first and second radiation control means movably mounted for movement along a path intermediate a source of radiation and an element receiving the radiation. The first and second control means control the intensity of the radiation received by the element as a function of their position in the path. Coupling means are provided between the first and second control means for controlling the movement of the second control means as a function of the movement of the first control means. The coupling means provides a predetermined range of movement for the first and second control means to the exclusion of the other and for joint movement of said first and second control means when the movement of the first control means exceeds the predetermined range. The second control means functions as a coarse radiation control to preset the predetermined range of first control independent movement into the range of radiation intensity to be applied to the element, while first control means functions as a fine control for accurately controlling the radiation applied to the element.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 1 is a block diagram of an enzyme analyzing apparatus embodying the invention.

FIGURE 2 is a schematic diagram of an embodiment of the optical portion of the enzyme analyzing apparatus of FIGURE 1.

FIGURE 4 is a plan view of the occluder of FIGURE 3.

FIGURE 5 is a side view of the occluder of FIGURE 4.

Figure 3:
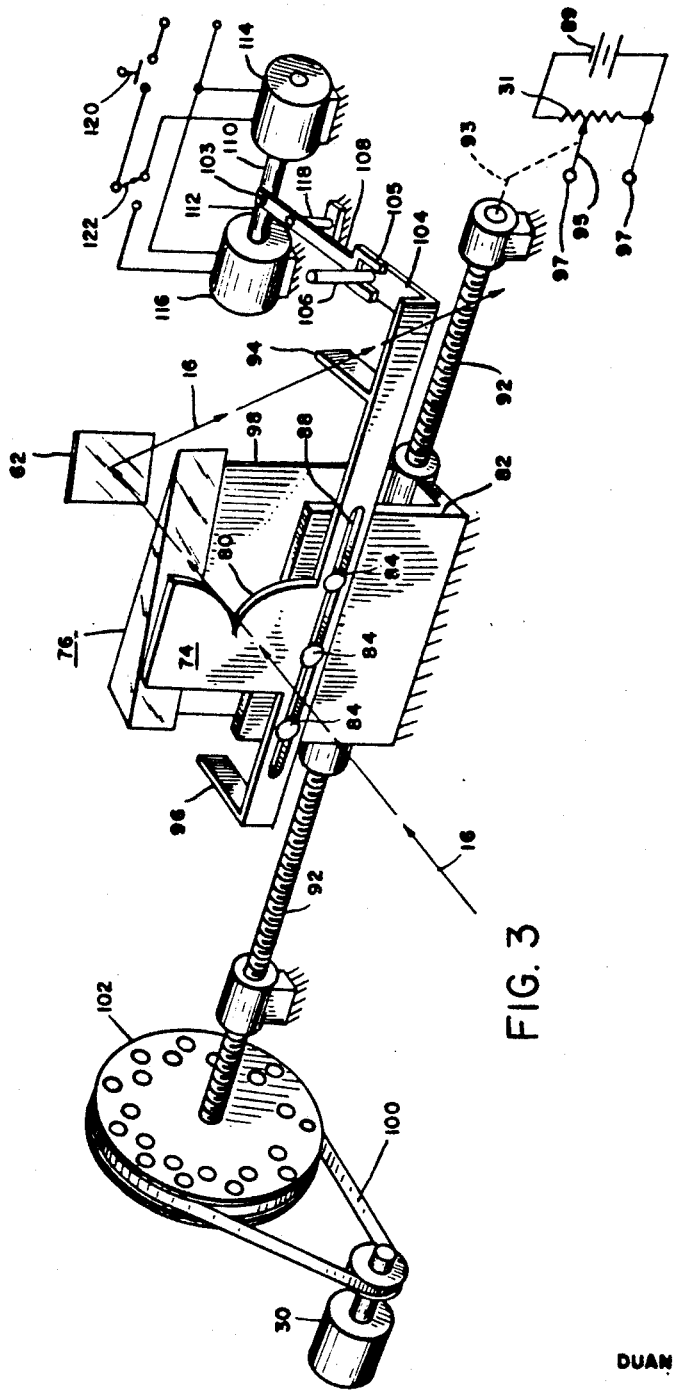
FIGURE 3 is a perspective view of a portion of optical control apparatus of the enzyme analyzing apparatus of FIGURE 1.

The radiation control apparatus of the invention will be described in the context of an enzyme analyzer. It is to be understood, however, that the fundamental concepts to be described are more generally applicable. The enzyme analyzing apparatus of FIGURE 1 includes a source of radiation 10 applying radiation on a beam switch 12. The beam switch 12 is driven by a motor 18 to chop the radiation applied to a beam splitter 20 at a 60 cycle rate. The beam splitter 20 provides alternate reference and sample beams 14 and 16 respectively that are 180° out of phase with each other and 90° out of phase with the line voltage. The chopped sample beam 16 is passed through a radiation control apparatus 22 embodying the invention and a sample compartment 24 to a photomultiplier tube 26. The chopped reference beam 14 is applied through manual set apparatus 27 that presets the intensity of the reference beam applied to the photomultiplier 26. Electrical signals corresponding to the intensity of the chopped reference and sample beams are generated by the photomultiplier 26, amplified by an amplifier 28 and applied to a field winding of a two phase servo motor 30. The other winding of the servo motor is energized by the line voltage. The servo motor 30 is coupled to drive the radiation control apparatus 22 thereby completing a feedback servo control for the enzyme analyzing apparatus.

Information storage means 32 such as a counter wheel or encoded disk is coupled to move in synchronous relation with the radiation control apparatus 22. A detector circuit 33 detects digital information stored in the information storage means 32 in response to the movement of the information storage means 32 to generate electrical digital signals that are a function of the movement of the optical balance apparatus 22. The detector circuit 33 is coupled to a sequence circuit 38 that is activated after a predetermined time interval of sufficient duration for the radiation control apparatus 22 to reach the initial balance or null position. After the predetermined time interval, the sequence circuit 38 applies the signals generated by the detector circuit 33 for a preset measuring time duration to a counter circuit 40. The counter circuit counts the signals that are proportional to the movement of the optical balance apparatus 22 to provide a reading corresponding to the rate of enzyme activity for the measuring time duration.

In operation when a test sample is inserted in the sample compartment 24 the photomultiplier 26 generates a 60 cycle signal having an amplitude and polarity determined by the difference in intensity between the test sample and reference beams. The amplified 60 cycle signal supplied to the motor 30 which rapidly drives the radiation control apparatus 22 to an initial balance (equalizing the intensity of the reference and sample beams) thereby presetting the apparatus in condition to analyze the kinetic enzyme activity of the sample under test. A potentiometer 31 is coupled to the radiation control apparatus 22 to provide a means for obtaining an analog signal corresponding to the position and movement of the radiation control apparatus.

Enzymes such as those found in blood serum, can be entered into a reversible chemical reaction wherein the radiation absorbance of the test sample changes as the chemical reaction proceeds. Depending upon the type of chemical reaction involved, the absorbance of the test sample increases or decreases. The rate of change of absorbance provides a measure of the kinetic activity of the test sample. The radiation control apparatus 22 continuously varies the intensity of the radiation applied to the test sample as an inverse function of the absorbance of the sample thereby providing a means for kinetically monitoring the enzyme activity of the test sample.

In order to effectively measure the enzyme activity of human blood serum, the instrument should be capable of covering a range in the order of 0.5 to 1.5 absorbance units. The absorbance of an enzyme sample varies as a logarithmic function of the radiation transmitted through the sample in accordance with the Beer Lambert equation. As a result, the radiation control apparatus 22 also controls the radiation applied to the test sample in an inverse logarithmic function of the absorbance of the test sample. In order to measure a 3:1 change in absorbance (0.5 to 1.5 absorbance units), the radiation control means 22 must be capable of controlling the amount of radiation applied to the test sample for at least a 10 to 1 change.

In the radiation control systems of the prior art, a single movable optical wedge is generally employed to accurately control the amount of radiation received by a control element. This is generally satisfactory if the range of intensities to be controlled is small. On the other hand, if a fairly wide range of intensities are to be controlled, a very long wedge is required which in many cases may be impractical. Furthermore, if a single large wedge is used to monitor a rapid chemical reaction, the time required to drive the single large wedge into an initial measuring position may be a considerable portion of the kinetic reaction time of the chemical reaction. In addition, it should be noted that the absorbance of a test sample can range from zero to infinity while the range of absorbance that can be readily measured by a wedge is finite. The range of absorbance of a wedge is determined by the absorbance index of the glass, wedge angle, and the wedge length. It is impractical to design an optical wedge in a manner so that its thickness increases linearly from zero absorbance to an infinite absorbance. A wedge generally includes discrete points wherein the absorbance changes abruptly from a finite value to zero or 100%. Any measurements at such limits results in an off-on type of control resulting in a non-linear operation. Where such wedges are employed in an automated system oscillations tend to occur as the wedge is driven beyond the range of linear control resulting in undesirable wear on the mechanism.

The radiation control apparatus of the invention includes two radiation control means, the first functioning a fine control and the second as a coarse control. The second control means cooperates with the first control means to condition the radiation control apparatus into the range of radiation intensities that will be applied during the test while the first control means accurately controls the radiation in the preset range to keep the system balanced as the chemical reaction proceeds.

Referring to FIGURE 2 the light source 10 is surrounded by the beam switch which in the present embodiment is a rotating optical shutter 42, formed with two diametrically opposed slots exhibiting an angle in the order of 88°. The optical shutter 42 is rotated at a constant speed by the motor 18 (FIGURE 1) to permit discrete beams of radiation to pass the optical shutter 42 to the beam splitter 20. The beam splitter 20 includes a block 44 having a cylindrical cavity 46 that is coaxial with the shutter 42 and includes two exit slits 46 and 48 formed in the block spaced 90° apart with respect to the axis of rotation of the shutter 42. The exit slits 46 and 48 allow radiation to emerge from the block 44 to form the two reference and sample beams 14 and 16, each chopped at 60 cycle per second rate and 180° out of phase with each other. The reference beam 14 is reflected by a plane mirror 50 to pass through a collimating lens 52, a filter 54, a condenser lens 56 and a filter 58 to a photocathode of the photomultiplier tube 26. The sample beam 16 passes through the radiation control apparatus 22 and is reflected by the plane mirror 62 to pass through a collimating lens 64, a filter 66, a condenser lens 68, the sample compartment 24, and a filter 58 to the photocathode of the photomultiplier tube 26. Mounted adjacent the reference beam exit 46 is the manual set apparatus 27, such as a movable jaw, that is adjusted during initial alignment to a radiation level that permits the testing of the most absorbent sample expected to be tested.

The radiation control apparatus 22 embodied in FIGURES 2–4 includes a fixed wedge 72, a first control means illustrated as a balancing wedge 76, and a second control means illustrated as an optical occluder 74. Both the fixed and balancing wedges 72 and 76 are made of a semi-transparent material such as N–1 glass. The fixed wedge 72 is stationary mounted adjacent the exit slit 48 to compensate for the prismatic effect of the balancing wedge 76. The balancing wedge 76 and the occluder 74 are movably mounted to travel along a path that intersects the sample beam 16 as illustrated in FIGURES 2–4. The occluder 74 functions as a coarse control means while the wedge 76 functions as the fine control means, to control the intensity of radiation received by a test sample as an inverse function of the transparency of the test sample, so that the intensity of the sample beam 16 traversing the sample compartment is controlled to equal that of the reference beam 14.

An embodiment of the occluder 74 is illustrated in FIGURES 3–5. The occluder 74 is formed of opaque material and has an opening 80 shaped in the form of a logarithmic function. The occluder 74 may for example be movably mounted to a base plate 82 by the bearing means 84. The bearing means 84 include elongated portions 86 (FIGURE 5) that pass through a slot 88 in the occluder 74 and are bearing mounted in the base plate 82. The bearing means 84 also include two enlarged end portions 90 that hold the occluder 74 in place and limit the movement of the occluder 74 along a path in the plane of the slot 88 as designated by the arrows 92 (FIGURE 4).

The occluder 74 is mounted with respect to the sample beam 16 (shown as a dashed cross-section 91 in FIGURE 4) so that the opening 80 intersects the sample beam as the occluder is moved. The logarithmic shape of the opening 80 provides a substantially constant or linear rate of control as the occluder is moved so that ratio of the change is radiation intensity per change of position remains substantially constant. It is to be understood that any particular shaped opening can be employed depending upon the desired type of control.

The balancing wedge 76 is mounted on a bracket 98 that is driven by a screw 92 (FIGURE 3) along a path that intersects the sample beam 16 so that the sample beam is exposed to varying thicknesses of the wedge. The bracket 98 is adapted to engage the extended portions 94 and 96 of the occluder 74 to drive the occluder when the balancing wedge 76 has exceeded a predetermined range of movement. It should be noted that balancing wedge 76 and the occluder 74 are free to move, to the exclusion of the other, for a range of movements determined by the distance between the extended portions 94 and 96 and the size of bracket 98. The position of the range of balancing wedge 76 movement to the exclusion of the occluder is determined by the position of the occluder 74 in its path of travel. The servo motor 30 is coupled to drive the screw 92 through a belt 100 and a counter disk 102 to drive the balancing wedge 76 in a direction to balance the intensity of the sample beam 16 to that of the reference beam 14.

The potentiometer 31 is connected to a source of energizing potential 89 (illustrated as a battery). The movable arm 95 of the potentiometer 31 is conventionally coupled to the screw 92 (illustrated schematically by the dashed line 93) to move in synchronous relation with the balancing wedge 76. A signal voltage is developed across the terminals 97 corresponding to the position of the wedge 76. The terminals 97 are adapted to be connected to a recording device to provide a plot of the movement of the balancing wedge 76.

The occluder 74 also includes a third extended portion 104 having a pin 106 extending from an end thereof that is adapted to engage a forked end 105 of a solenoid lever 108. The opposite end 103 of the solenoid lever 108 is pivotally coupled to the movable slugs 110 and 112 of a pair of solenoids 114 and 116 respectively. The lever arm 108 is pivotally mounted for rotation about a pivot point 118.

The solenoids 114 and 116 are connected to be energized through a momentary contact start switch 120 and a two position selector switch 122. The selector switch 122 selects the direction the occluder is initially moved in accordance with the type of chemical reaction that would take place. For example, if the chemical reaction is such that the radiation absorbance of the test sample will increase as the chemical reaction progresses, the switch 122 is positioned (as shown) to energize the solenoid 114. On the other hand if the radiation absorbance of the test sample is decreased as the chemical reaction progresses the switch 112 is positioned to select the solenoid 116. The solenoids 114 and 116 function to move the occluder 74 in a direction to introduce a large initial unbalance into the system at the start of a test run depending upon the type of chemical reaction being monitored.

For purposes of illustration it is assumed that a test enzyme and the required chemical reagents for producing a chemical reaction that results in increasing the radiation absorbance of the test sample is inserted in the sample compartment 24. The switch 122 is preset (as shown) to provide for the energization of the solenoid 114. When the start push-button 120 is momentarily depressed, the solenoid 114 is energized thereby moving the occluder 74 toward the counter wheel 102 and introducing a large unbalance in the system. The servo motor 30 rapidly responds to the resultant 60 cycle signal generated by the photomultiplier tube to drive the balancing wedge 76 in a direction to balance the system (away from the counter wheel 102). The bracket 98 of the balancing wedge 76 engages the occluder extended portion 94 so that the servo motor drives both the balancing wedge 76 and the occluder 74. The opening 80 in occluder 74 is shaped so that the occluder exerts a substantially greater effect on intensity of the radiation received by the test sample than the wedge 76.

The combined effect of driving both the wedge 76 and the occluder 74 increases the gain of the servo system over that of the wedge alone providing an under-damped servo system. As a result, the response of the system is such that the wedge 76 and occluder 74 overshoot the initial balance position. This reverses the polarity of the signal generated by the photomultiplier tube 26. The servo motor 30 responds to the reversed signal polarity to drive the balancing wedge 76 in the opposite direction (toward the counter wheel 102) to an initial balance condition. Since the wedge 76 is moved in the opposite direction, the occluder 74 is disengaged and left about the point of maximum overshoot. The initial balance point of the wedge 76 is primarily determined by the position at which the occluder 74 is preset providing thereby a coarse radiation control means for conditioning the apparatus for testing the particular sample in the sample compartment. The wedge 76 is now free to move in the range between the extended portions 94 and 96 to the exclusion of the occluder 74 providing a fine radiation control means. While only driving the wedge 76 the gain of the servo system is reduced, thereby exhibiting a higher damping factor and providing a means for effectively continuously balancing the system (within the range of movement to the exclusion of the occluder) without any noticeable overshoot.

As previously mentioned, the chemical reaction in the particular example is the type wherein the absorbance of the test sample increases as the chemical reaction progresses. Furthermore, the system is balanced by equalizing the intensity of the sample beam to the reference beam. As a result the wedge 76 is now driven (after the overshoot) in the direction to decrease the wedge thickness exposed to the sample beam 16 (toward the counter wheel 102) to continuously balance the system. It should be noted, as the wedge 76 is back-tracked from the maximum overshoot position, all the dead-band and back-lash in the system is taken up. When the wedge 74 reaches the point of the initial null, any subsequent movement due to the chemical reaction is in the same direction wherein wedge 76 provides a means of measuring the change in absorbance (enzyme activity) with a minimum of error due to the above non-linearities.

In the case wherein the chemical reaction monitored causes the absorbance of the test sample to decrease, the switch 122 is set to energize the solenoid 116. The system functions in the same manner as previously described except for reversing the directions of travel of the balancing wedge 76 and the occluder 74.

The counter wheel 102 provides a means for generating a digital signal that is a function of the balancing operation of the wedge 76 and therefore a signal corresponding to the activity of the enzyme tested. Means for sensing the rotation of the disk 102 such as a source of radiation and photosensor, can be mounted adjacent the counter wheel 102 to provide a signal pulse each time a hole passes a photosensor. The pulses generated are applied to a counter circuit 40 over a controlled period of time as determined by the sequence circuit 38. As a result, a digital signal can be obtained corresponding to the linear movement of the balancing wedge 76 (and therefore also the rate of change of radiation absorbance) as well as the analog signal developed by the potentiometer 31.

The effect of the occluder 74 extends the range of operation of the wedge 76. For example, it was found that a wedge 78 millimeters in length having an angle in the order of 11° when used with the occluder 74 of FIGURE 4 has an effective range of at least four times that of the wedge alone. In addition, approximately the same range of fine adjustments is available throughout the range of the instrument. The above mentioned wedge provided a fine adjustment control wherein the transmission changed in the order of 66.7% per change in millimeter of thickness. Accordingly an accurate and gradual fine control is provided for a wide range of radiation levels without resorting to large sized optical controls. It should be noted, with the occluder 74 primarily determining the amount or range of radiation applied to the sample, the wedge 76 is free to adjust the radiation about the preset range. In effect the combination of wedge and occluder can provide a linear control about a range that effectively approaches infinite absorption. This eliminates the problem of non-linearities introduced by a single wedge at the point wherein the absorption is changed from a finite value to infinite.

Furthermore, the high gain rapidly responsing servo system including both the occluder and wedge quickly drives the system into an initial balance condition. This is particularly advantageous in testing rapidly responding chemical reactions wherein the system can monitor the initial portion of the reaction. On the other hand if a single large wedge is employed, the time required to drive the wedge into the balance condition to monitor such reaction may be a considerable portion of the reaction time and thereby missing the initial portion of the reaction.

I claim:

1. Apparatus for controlling the amount of radiation received by an element from a source of radiation comprising:
   first control means movably mounted for movement along a path intermediate said source of radiation and said element to control the amount of radiation received by said element as a function of the position of said first control means;
   second control means movably mounted for movement along a path intermediate said source of radiation and said element to control the amount of radiation received by said element as a function of the position of said second control means;
   means for controlling the movement of said first control means along said path;
   coupling means coupling said first control means to said second control means for controlling the movement of said second control means as a function of the movement of said first control means, said coupling means providing a predetermined range of movement for said first control means to the exclusion of said second control means and for joint movement of said first and second control means when the movement of said first control means exceeds said range whereby said first and second control means cooperate to control the amount of radiation received by said element.

2. Apparatus as defined in claim 1 wherein:
   said second control means exhibits a greater effect upon the intensity of radiation received by said element in response to the movement of said first control means beyond said predetermined range of movement than said first control means, thereby providing a coarse radiation control when both said first and second control means are moved and a fine radiation control when said first control means moves in said predetermined range.

3. Apparatus as defined in claim 1 including:
   means for directing a beam of the radiant output from said source of radiation on said element;
   wherein said first control means comprises a radiation absorbent device of varying thickness and movably mounted to intersect said beam of radiation so that said beam passes through a portion of said device, the amount of said radiation absorbed by said device being a function of the thickness of said device receiving said radiation; and
   wherein said second control means comprises an opaque device formed with an opening therein, said opaque device being movably mounted along a path so that said opening intersects said beam of radiation whereby the amount of radiation reaching said element is determined by the portion of said opening being located in the path of said beam of radiation.

4. Apparatus as defined in claim 3 wherein the shape of said opening formed in said second control means approaches a logarithmic function so that the ratio of the change in radiation intensity reaching said element per equal increments of movement of said second control means along said path remains substantially constant.

5. Apparatus as defined in claim 3:
   wherein said transparent device comprises an optical wedge mounted to move along a straight line to intersect said beam of radiation so that the thickness of the portion of said wedge intersecting said beam of radiation and amount of said beam of radiation absorbed by said wedge is a substantially linear function of the movement of said wedge, and
   means coupled to said means for controlling the movement of said first control means for measuring the movement of said wedge and providing an indication corresponding to the percentage of said beam of radiation absorbed by said wedge as a function of the movement of said wedge.

6. Apparatus as defined in claim 1 including:
   means coupled to said second control means for initially positioning said second control means in a preset position in its path of movement.

7. In radiation control systems wherein a movably mounted optical wedge is employed to move along a path to intersect a beam of radiation to control the intensity of radiation received by an element, apparatus for extending the effective radiation control range of the optical wedge comprising:
   a radiation attenuator movably mounted to move along a path to intersect said beam of radiation, said attenuator being formed with an opening therein so that as said attenuator moves to intersect said beam the intensity of the radiation received by said element is determined by the portion of said opening being located in said beam of radiation, and
   means coupling said attenuator to said wedge to allow said optical wedge to be individually driven over a predetermined range of movement and to allow said optical wedge and radiation attenuator to be collectively driven when said predetermined range is exceeded, wherein said wedge and attenuator cooperate to control the intensity of radiation received by said element.

8. The apparatus as defined in claim 7 wherein a movement of said attenuator exerts a greater control over the intensity of radiation received by said element than a corresponding movement of said wedge whereby said attenuator functions as a coarse radiation control for determining the range of intensities controlled by said wedge in said predetermined range of movement.

9. The apparatus as defined in claim 8 wherein the shape of said opening formed in said attenuator approaches a logarithmic function so that the ratio of the change in radiation intensity received by said element per equal increment of movement of said attenuator is substantially constant.

10. The apparatus as defined in claim 8 including means for positioning said attenuator to at least one predetermined position so that in response to the positioning of said attenuator said wedge and said attenuator are initially jointly moved to preset the intensity of radiation received by the element into a range of intensities to be controlled by said wedge in said predetermined range of movement.

11. The apparatus as defined in claim 7 wherein the position of said predetermined range of movement in said optical wedge path is determined by the position of said attenuator in its path of movement.

12. Apparatus for controlling the amount of radiation received by an element from a source of radiation comprising:

first control means movably mounted for movement along a path intermediate said source of radiation and said element to control the amount of radiation received by said element as a function of the position of said first control means;

second control means movably mounted for movement along a path intermediate said source of radiation and said element to control the amount of radiation received by said element as a function of the position of said second control means;

first means coupled to said first control means for applying a force to move said control means along its path;

second means coupled to said second control means for applying a force to move said control means along its path; and coupling means coupling said first and second control means so that said first control means is individually driven over a predetermined range of motion in response to a force applied by said first means, said second control means is individually driven over a predetermined range of motion in response to a force applied by said second means and wherein said first and second control means are collectively driven in response to a force applied by said first means when said first control means is driven beyond its predetermined range of motion.

13. The apparatus as defined in claim 12 wherein said predetermined range of motion of said first and second control means is substantially equal and wherein the position of said predetermined range of motion of said first control means along its path of movement is determined by the position of said second control means in its path of movement.

14. The apparatus as defined in claim 12 wherein:
said first control means comprises an optical wedge; and
said second control means comprises an opaque attenuator formed with an opening therein and movably mounted so that the position of said opening with respect to said source and said element determines the intensity of radiation received by said element.

15. The apparatus as defined in claim 14 wherein said second means comprises an electrical solenoid coupled to said second control means to position said second control means in its predetermined range of movement in response to the energization thereof.

References Cited

UNITED STATES PATENTS

| | | | |
|---|---|---|---|
| 2,439,373 | 4/1948 | Stearns | 250—204 X |
| 2,945,132 | 7/1960 | Schüch | 250—237 X |
| 3,013,470 | 12/1961 | Pliskin | 250—204 X |
| 3,017,801 | 1/1962 | Ingber | 250—237 X |
| 3,020,460 | 2/1962 | Morin et al. | 250—204 X |

JAMES W. LAWRENCE, *Primary Examiner.*

C. R. CAMPBELL, *Assistant Examiner.*

U.S. Cl. X.R.

250—201, 204